US008663012B2

(12) United States Patent
Weingardt

(10) Patent No.: US 8,663,012 B2
(45) Date of Patent: Mar. 4, 2014

(54) NETWORKED, ELECTRONIC GAME TOURNAMENT METHOD AND SYSTEM

(76) Inventor: Gary Weingardt, Las Vegas, NV (US)

( * ) Notice: Subject to any disclaimer, the term of this patent is extended or adjusted under 35 U.S.C. 154(b) by 979 days.

(21) Appl. No.: 11/956,497

(22) Filed: Dec. 14, 2007

(65) Prior Publication Data

US 2008/0113815 A1 May 15, 2008

Related U.S. Application Data

(63) Continuation-in-part of application No. 11/112,291, filed on Apr. 22, 2005.

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .................... 463/42; 463/16; 463/20; 463/25

(58) Field of Classification Search
USPC .......................................... 463/16, 20, 25, 42
See application file for complete search history.

(56) References Cited

U.S. PATENT DOCUMENTS

| | | | | |
|---|---|---|---|---|
| 6,431,545 | B1 | 8/2002 | Kuhne | |
| 8,016,678 | B1 * | 9/2011 | Hutter et al. | 463/42 |
| 2001/0027130 | A1 | 10/2001 | Namba et al. | |
| 2003/0190960 | A1 * | 10/2003 | Jokipii et al. | 463/42 |
| 2004/0147319 | A1 * | 7/2004 | Aviyants | 463/40 |
| 2006/0241795 | A1 | 10/2006 | Weingardt et al. | |

* cited by examiner

*Primary Examiner* — Milap Shah
*Assistant Examiner* — Jason Pinheiro
(74) *Attorney, Agent, or Firm* — Weiss & Moy, P.C.; Jeffrey D. Moy

(57) ABSTRACT

A plurality of players of at least one electronic game are enabled to play the game over a network. Players are ranked, based on accomplishments during game play, on a grid having multiple vertical levels and, on at least one of the vertical levels, multiple horizontal tiers. Player rankings are adjusted, following game play, based on points earned or lost. In one embodiment, defending players may be compensated without regard to game outcome.

30 Claims, 22 Drawing Sheets

Using the NovaLogic title Delta Force, Black Hawk Down:

| Item | Multiplier | | | Notes |
|---|---|---|---|---|
| Win | 10 | | | |
| Loss | -5 | | | |
| Tier Difference Win | 1000 | per Tier | | If Lower beats Upper |
| Tier Difference Loss | -200 | per Tier | | If Upper looses to Lower |
| Tier Difference Win | 50 | per Tier | | If Upper beats Lower |
| Kill | 5 | | | |
| Death | -5 | | | |
| Sniper Kill | 7 | | | |
| Knife Kill | 10 | | | |
| Suicide | -5 | | | |
| Head Shot | 12 | | | |
| Shots per Kill | -2 | | | |

| Defender | Lvl 4, Tier 7 | | | Challenger | Lvl 5, Tier 7 | |
|---|---|---|---|---|---|---|
| Item | Multiplier | Experience | | Item | Multiplier | Experience |
| Win | 1 | 10 | | Loss | 1 | -5 |
| Tier Diff | 10 | 500 | | Tier Diff | 10 | |
| Kills | 30 | 150 | | Kills | 28 | 140 |
| Deaths | 29 | -145 | | Deaths | 30 | -150 |
| Snipe Kills | 5 | 35 | | Snipe Kills | 10 | 70 |
| Suicides | 1 | -5 | | Suicides | 0 | 0 |
| Knife Kills | 3 | 30 | | Knife Kills | 2 | 20 |
| HeadShots | 5 | 60 | | HeadShots | 7 | 84 |
| Shots per | | | | Shots per | | |
| Kill | 11 | -22 | | Kill | 6 | 12 |
| **Match XP** | | **613** | | **Match XP** | | **147** |

*Figure 13A: Example 1(Defender-higher level player beats challenger-lower level player)*

FIG. 13A

| Defender | Lvl 4, Tier 7 | | | Challenger | Lvl 5, Tier 7 | |
|---|---|---|---|---|---|---|
| Item | Multiplier | Experience | | Item | Multiplier | Experience |
| Loss | 1 | -5 | | Win | 1 | 10 |
| Tier Diff | 10 | -2000 | | Tier Diff | 10 | 10000 |
| Kills | 20 | 100 | | Kills | 30 | 150 |
| Deaths | 31 | -156 | | Deaths | 22 | -110 |
| Snipe Kills | 1 | 7 | | Snipe Kills | 7 | 49 |
| Suicides | 1 | -5 | | Suicides | 2 | -10 |
| Knife Kills | 1 | 10 | | Knife Kills | 13 | 130 |
| HeadShots | 10 | 120 | | HeadShots | 22 | 264 |
| Shots per | | | | Shots per | | |
| Kill | 4 | -8 | | Kill | 22 | -44 |
| **Match XP** | | **-1936** | | **Match XP** | | **10439** |

*Figure 13B: Example 2(Defender-higher level player looses to challenger-lower level player)*

FIG. 13B

NETWORKED, ELECTRONIC GAME TOURNAMENT METHOD AND SYSTEM

RELATED APPLICATION

The present application is a continuation-in-part of, and claims priority to, U.S. patent application Ser. 11/112,291, filed Apr. 22, 2005, which is incorporated herein by reference in its entirety.

FIELD OF THE INVENTION

The present invention relates generally to games, and more particularly to online interactive electronic games, and their use in tournament play.

BACKGROUND OF THE INVENTION

Video games are an international phenomenon. According to a recent documentary, there were over 800,000,000 active video game players worldwide in 2005. Popular in-home game systems include the Wii™, Play Station™, X-Box™, PC, and Game Cube™. Video game play over the Internet is also extremely popular and growing.

Many players desire a method in which they can pit their skills against another player. Certain Internet-based game sites provide a ladder-type ranking system, which ranks players according to the score they generate on a hosted game. Examples include YAHOO!® GAMES, msn® games, My Gaming Ladder and Gaming Scripts. Electronic Arts™ is one of the largest game manufacturers in the world. Each of their games has its own individual ladder, EA™ calls its ladders "leaderboards." One of EA™'s most popular games is BATTELFIELD 2: MODERN COMBAT™ and its leaderboard can be viewed on its website.

Ser. No. 11/112,291, of which this is a continuation-in-part, describes a new ladder system for video games that improves upon the vertical style ranking ladders in use currently. Among other improvements, it adds a horizontal element to a vertical ladder system, to allow more than one player to be placed on a single tier. Among other things this would permit participation by players in substantially higher numbers than may be effectively accommodated in a simple vertical ranking structure. It provides other improvements as well, including a system for compensating defenders and, in general, professionalizing video gaming.

The present application adds additional features that are intended to further enhance the competitive video gaming experience.

SUMMARY OF THE INVENTION

In accordance with one embodiment of the present invention, a networked, electronic game method is disclosed. The method comprises: accepting participation in play of an electronic game over a network by a plurality of players; determining a rank for individual players of the plurality of players; positioning the ranked individual players on a grid; wherein the grid has a plurality of vertical levels and wherein individual vertical levels have a plurality of horizontal tiers; enabling issuance of a challenge by a lower-ranked challenger player against a higher-ranked defender player; enabling acceptance of the challenge by the defender; enabling play of the electronic game over the network by the challenger against the defender; one of awarding and deducting points for at least one of the challenger and the defender based on the play of the electronic game over the network; adjusting the rank of at least one of the challenger and the defender as a consequence of the one of awarding and deducting points based on the play of the electronic game over the network; and facilitating one of vertical and horizontal movement of at least one of the challenger and the defender along the grid, in response to the adjustment in rank.

In accordance with another embodiment of the present invention, a networked, electronic game method is disclosed. The method comprises: accepting participation in play of an electronic game over a network by a plurality of players; determining a rank for individual players of the plurality of players; positioning the ranked individual players on a grid; wherein the grid has a plurality of vertical levels and wherein individual vertical levels have a plurality of horizontal tiers; enabling issuance of a challenge by a lower-ranked challenger player against a higher-ranked defender player; enabling acceptance of the challenge by the defender; enabling play of the electronic game over the network by the challenger against the defender; providing compensation to the defender for participating in the game against the challenger, without regard to an outcome of the game; one of awarding and deducting points for at least one of the challenger and the defender based on the play of the electronic game over the network; wherein the awarding and deducting points for at least one of the challenger and the defender based on the play of the electronic game over the network depends on a plurality of criteria, including game outcome and at least one skill exhibited during play of the game not connected to game outcome; adjusting the rank of at least one of the challenger and the defender as a consequence of the one of awarding and deducting points based on the play of the electronic game over the network; and facilitating one of vertical and horizontal movement of at least one of the challenger and the defender along the grid, in response to the adjustment in rank.

In accordance with a further embodiment of the present invention, a game system is disclosed. The system comprise: a grid having a plurality of vertical levels and wherein individual vertical levels have a plurality of horizontal tiers; an electronic game; a communications network; wherein a plurality of players, including at least one challenger and at least one defender, are capable of playing the game over the communications network: wherein the at least one defender is ranked into one or more of the plurality of tiers on the grid based on points accumulated during play of the game over the communications network; and a challenge invocation modules utilizable by the challenger, to issue a challenge to at least one defender to play the game over the communications network.

BRIEF DESCRIPTION OF THE DRAWINGS

FIG. 13 is an illustration of scoring for a challenge match between two players, in which the higher-ranked player has defeated the lower-ranked player.

DETAILED DESCRIPTION OF THE PREFERRED EMBODIMENTS

Figure 8:
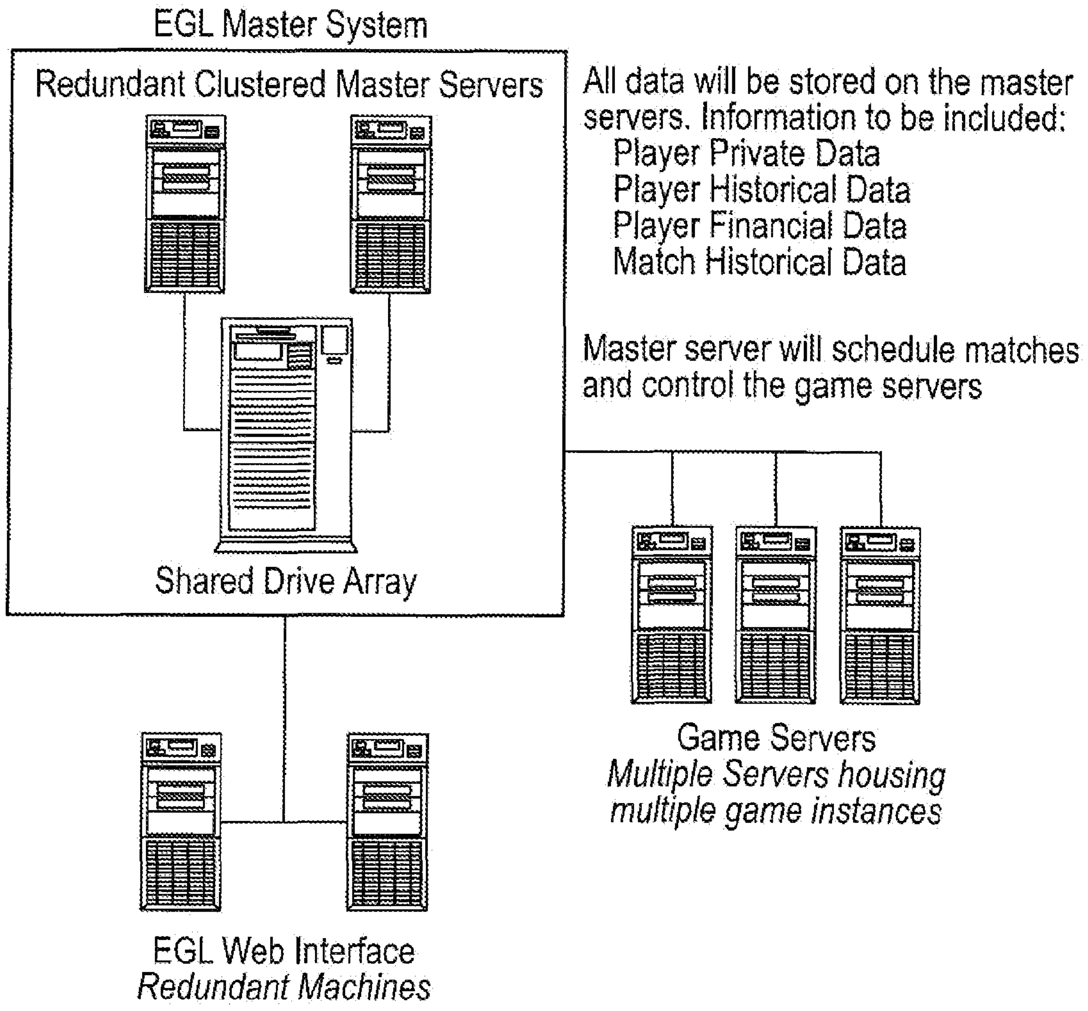
FIG. 8 is a diagram of a hardware configuration for a game system in accordance with an embodiment of the present invention.

Referring first to FIG. 8, a network which may be utilized in connection with the system and method of the present invention is illustrated. As shown in FIG. 8, a master system which may include a plurality of master servers sharing a drive array is networked with a plurality of game servers and with a web interface. Players utilizing personal computers or the like (not shown) may connect with the web interface over the Internet or other network.

In one embodiment, player data is stored at the master system. This may include the player's registration information, scoring information, and information regarding credits and/or money accumulated by the player during play of the game. The game servers may be utilized to host the play of games between challengers and defenders, as described below.

From time to time, the participants in the present invention are categorized as "challengers" and "defenders." Generally, a challenger is a lower-ranked player who initiates play of a game against a higher-ranked player, who will be regarded as the defender. It should be apparent that the same player may be a challenger at times and a defender at other times, depending on the relative rankings of the players participating in a particular game. In an embodiment of the present invention, defenders may be provided with compensation for their services in defending their position against one or more challengers. In one embodiment, defenders may be provided with compensation for defending their tier without regard to the outcome of the game itself. Challengers may be required to pay an entry fee to participate in challenge game and, as described in more detail below, the amount charged may be varied based on desired criteria.

Figure 3:
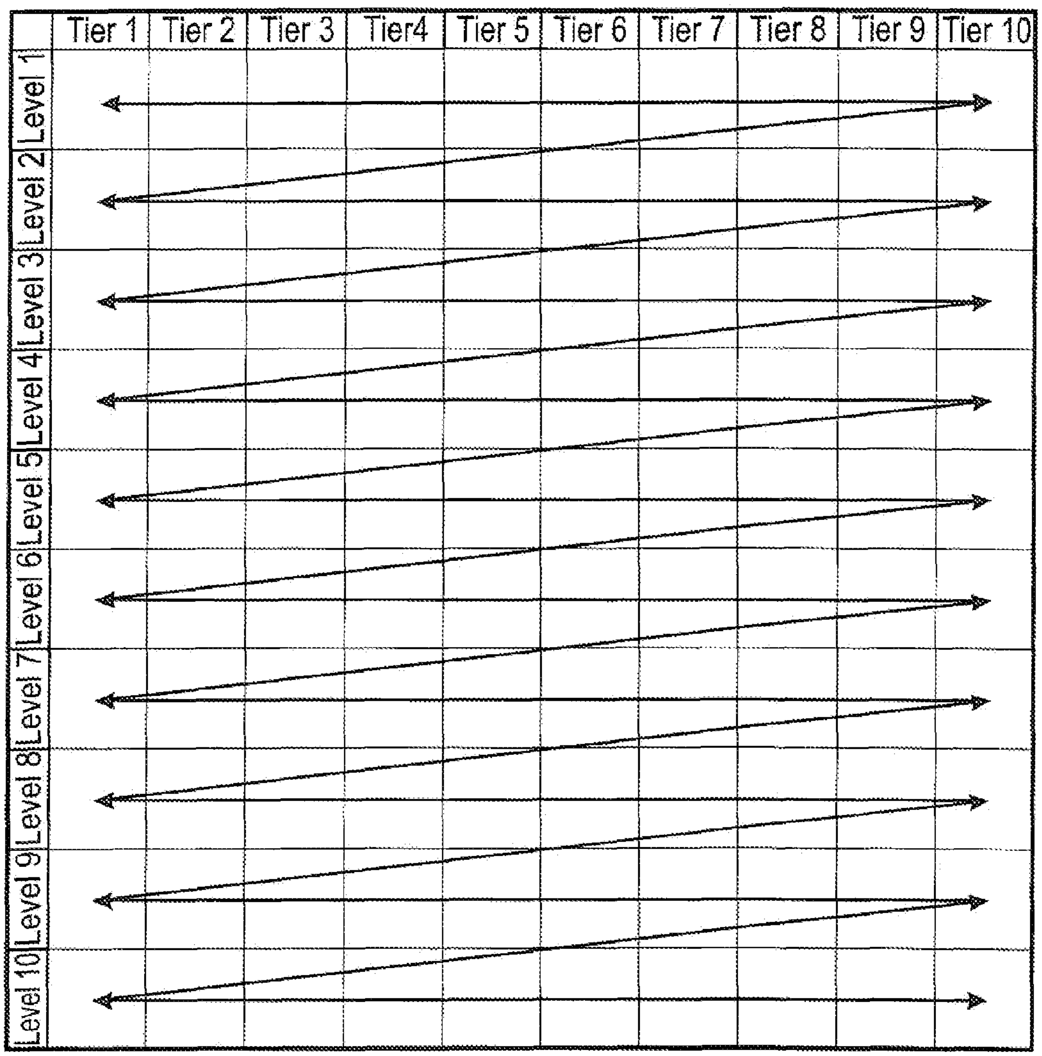
FIG. 3 is an image of a player grid, illustrating possible player advancement along the grid, in accordance with an embodiment of the present invention.

A player seeking to participate in a game system consistent with an embodiment of the present invention, and to become ranked on a grid such as that shown in FIG. 3 and described in more detail below, may initially be required to register. During registration, player information may be received into a database. This may initially include identifying information, such as name, address (street and email), username, password, and other desired information. As a player participates in games on the system, additional information relating to the player will be added to the database, including game scores, game statistics, tournament performance, grid location, and other desired information. If a player is sponsored and/or a member of a team, such information may also be included in the player's registration information.

During the play of video games in accordance with the present invention, registered players can obtain rankings according to achievements in the play of the video game. These achievements may differ from game to game. Positive achievements may include points scored, wins, kills, types of kills, acquired objects, territory or flags captured, skill set scores or any other measurable achievement that may be possible during the play of the game. A player ranking may decline to a lack of achievement and/or poor achievement, from a failure to make and/or accept challenges with other players, or the like.

Player rankings are placed on a multiple level, multiple tier structure referred to herein as a "grid," which may permit vertical, horizontal, diagonal or even three dimensional player movement. The grid may have a fixed number of levels and tiers, or may be dynamic, and capable of either expanding or contracting depending on desired factors, including for example the number of participating players. FIG. 3 illustrates a grid having ten levels and ten tiers. As indicated by the arrows, players may advance horizontally within a level from a higher number tier to a lower number tier, and may advance vertically from a higher number level to a lower number level. (As discussed in greater detail below, movement may not be restricted to one tier or even one level at a time.) In this example, level 1, tier 1 is the highest position on the grid, and level 10, tier 10 is the lowest.

Individual tiers include, in this embodiment, a plurality of players. It can be seen how a multiple level, multiple tier grid can accommodate large numbers of players. For example, if each tier holds one thousand active players, and if each level has ten tiers, 10,000 players may be accommodated on each level and the grid as a whole may rank 100,000 players. Of course, these numbers are exemplary, and the actual numbers employed may be varied as desired—for example, as new players are added to the grid. It should be noted that it is not a requirement that each level include an identical number of tiers, and the grid does not necessarily need to have a square shape. Different levels can have different numbers of tiers, with the result that the grid could have various shapes, including a square, rectangle, triangle or other desired shapes.

Figure 5:
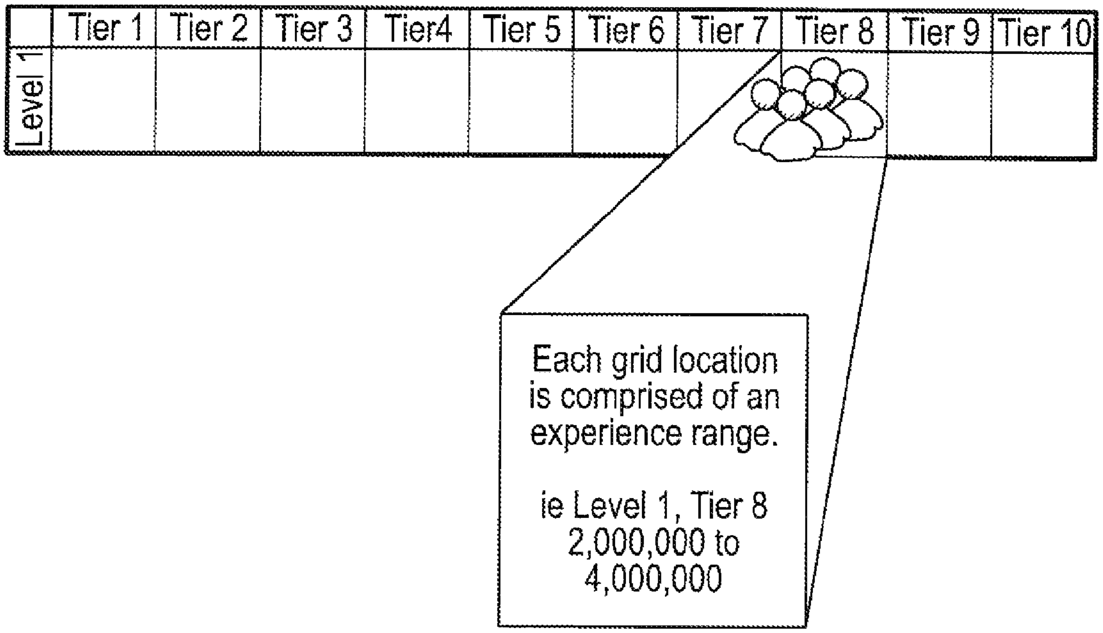
FIG. 5 is an image of a single level of a multiple level grid that may be used in accordance with an embodiment of the present invention, focusing on an individual tier on that level.
Figure 6:
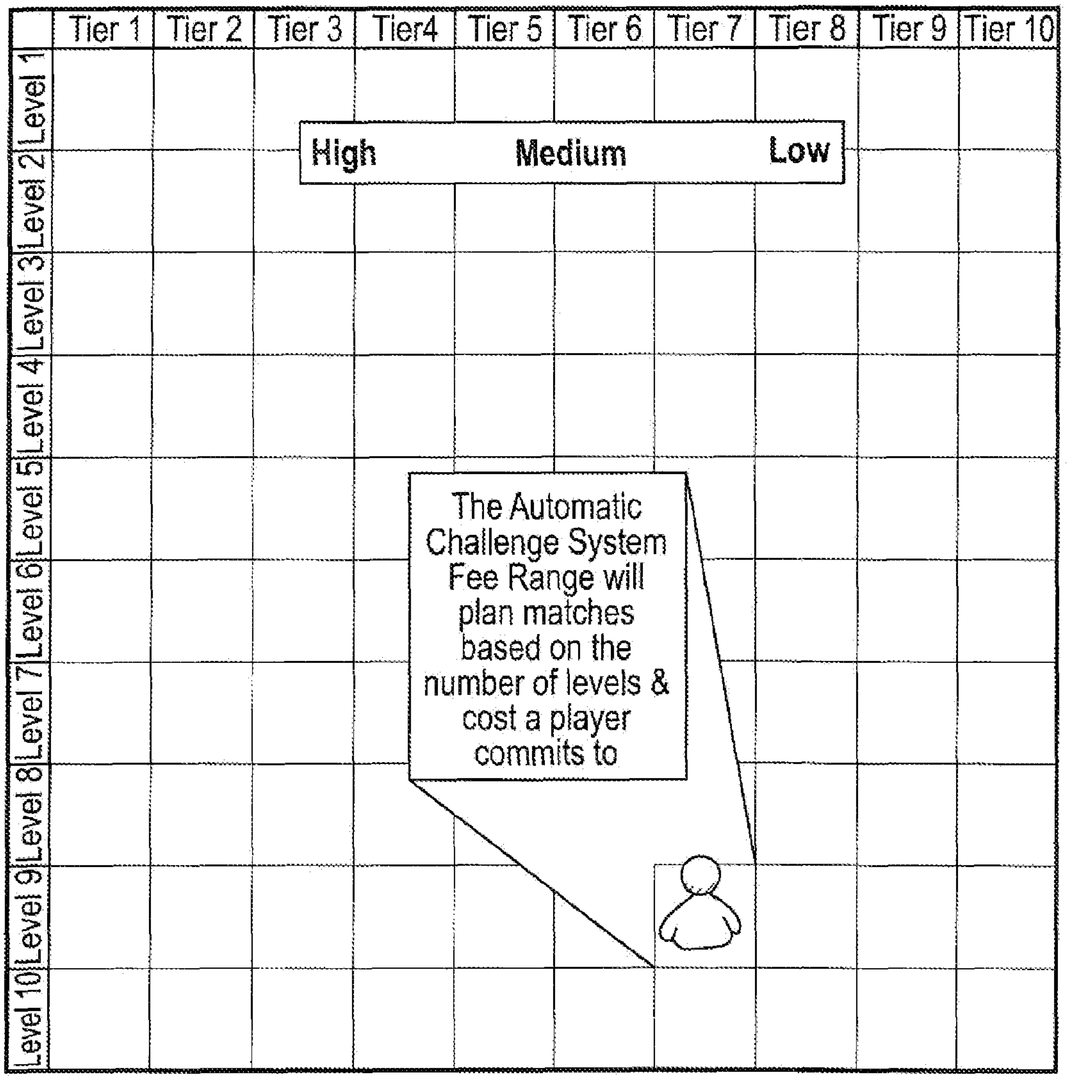
FIG. 6 is an image of a grid, illustrating an automatic challenge feature of an embodiment of the present invention.
Figure 7A:
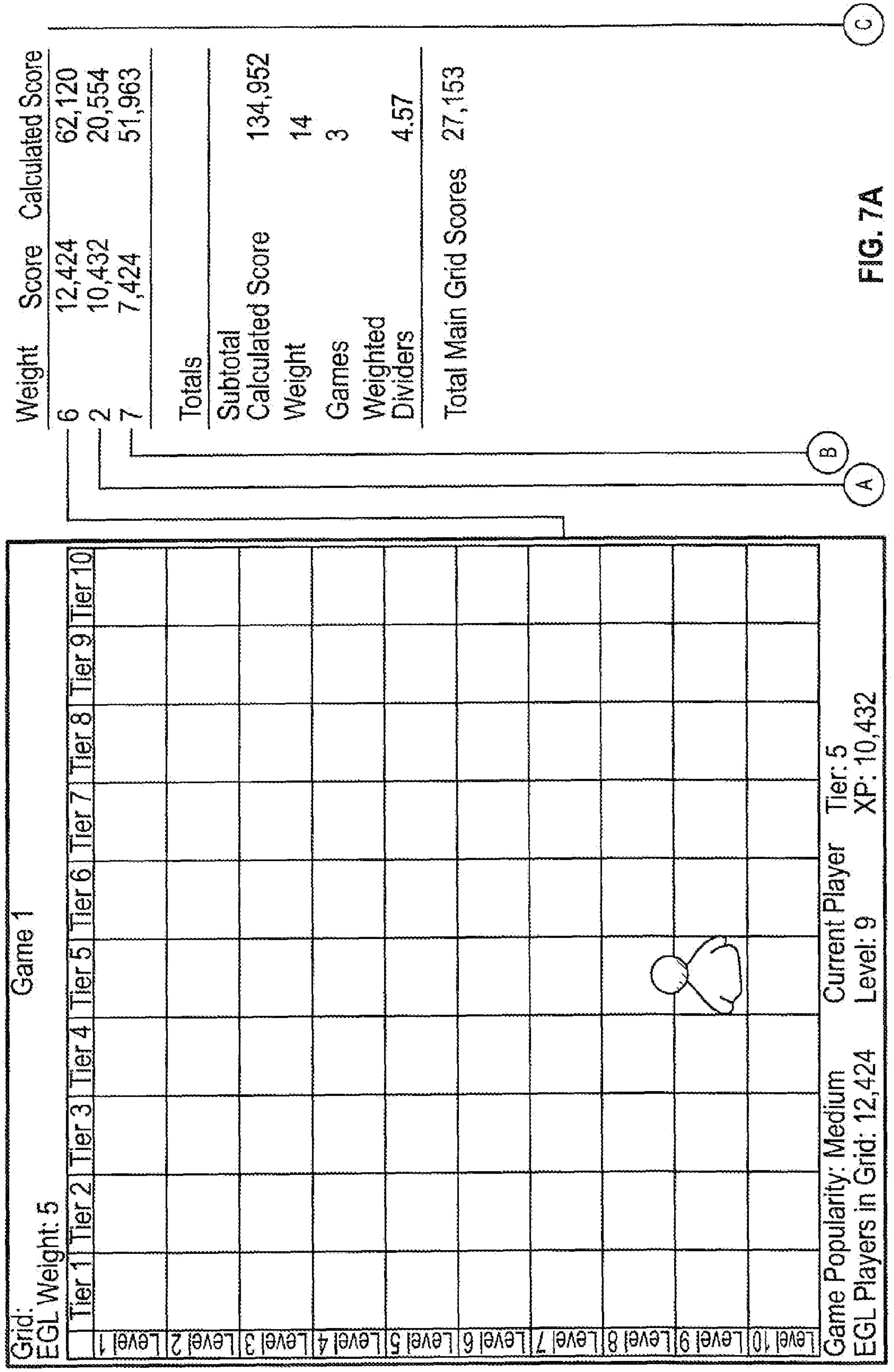
FIG. 7 is an image of a plurality of grids, illustrating placement of a player within a particular level and tier in accordance with an embodiment of the present invention.
Figure 7B:
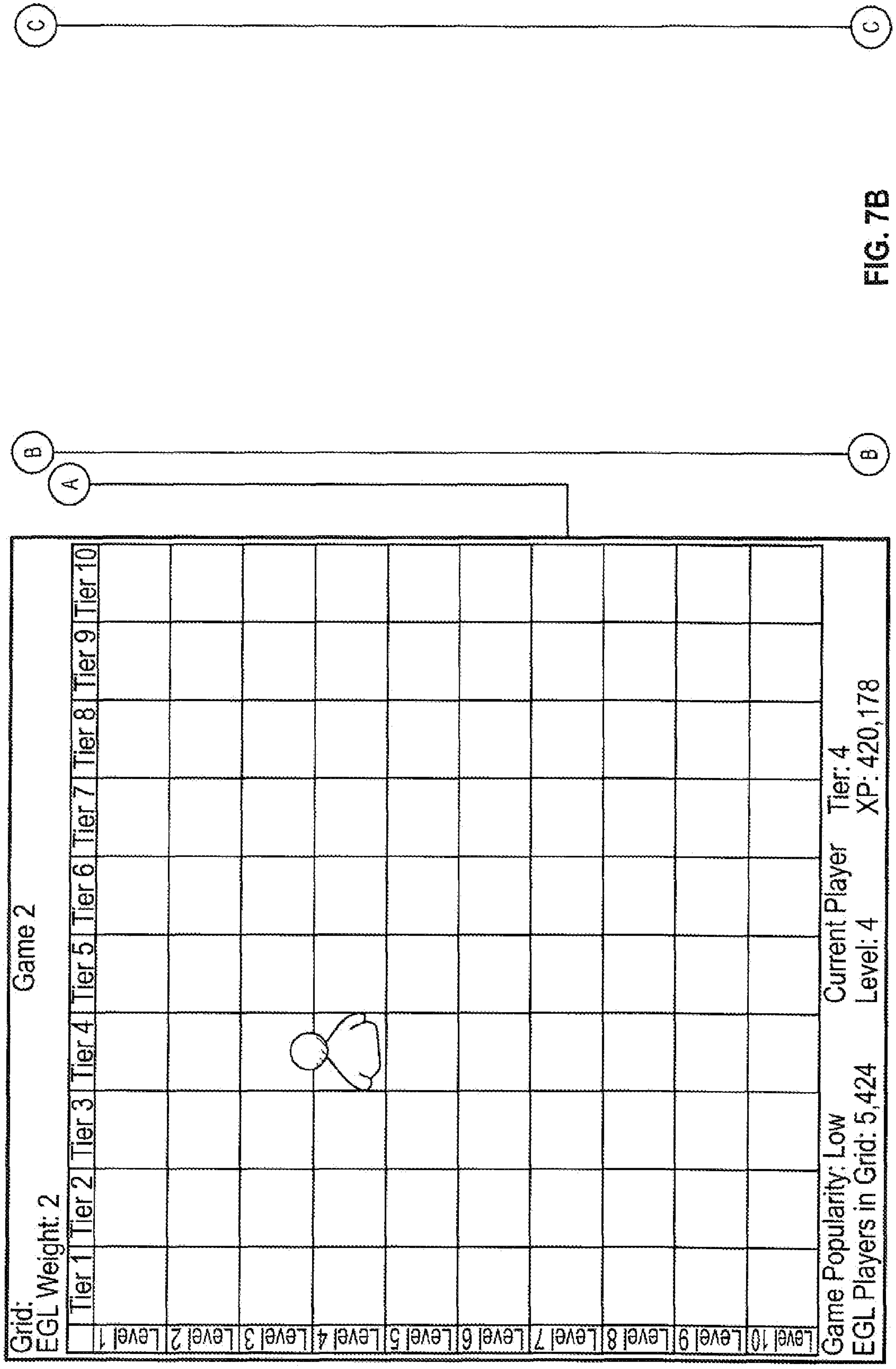
Figure 7C:
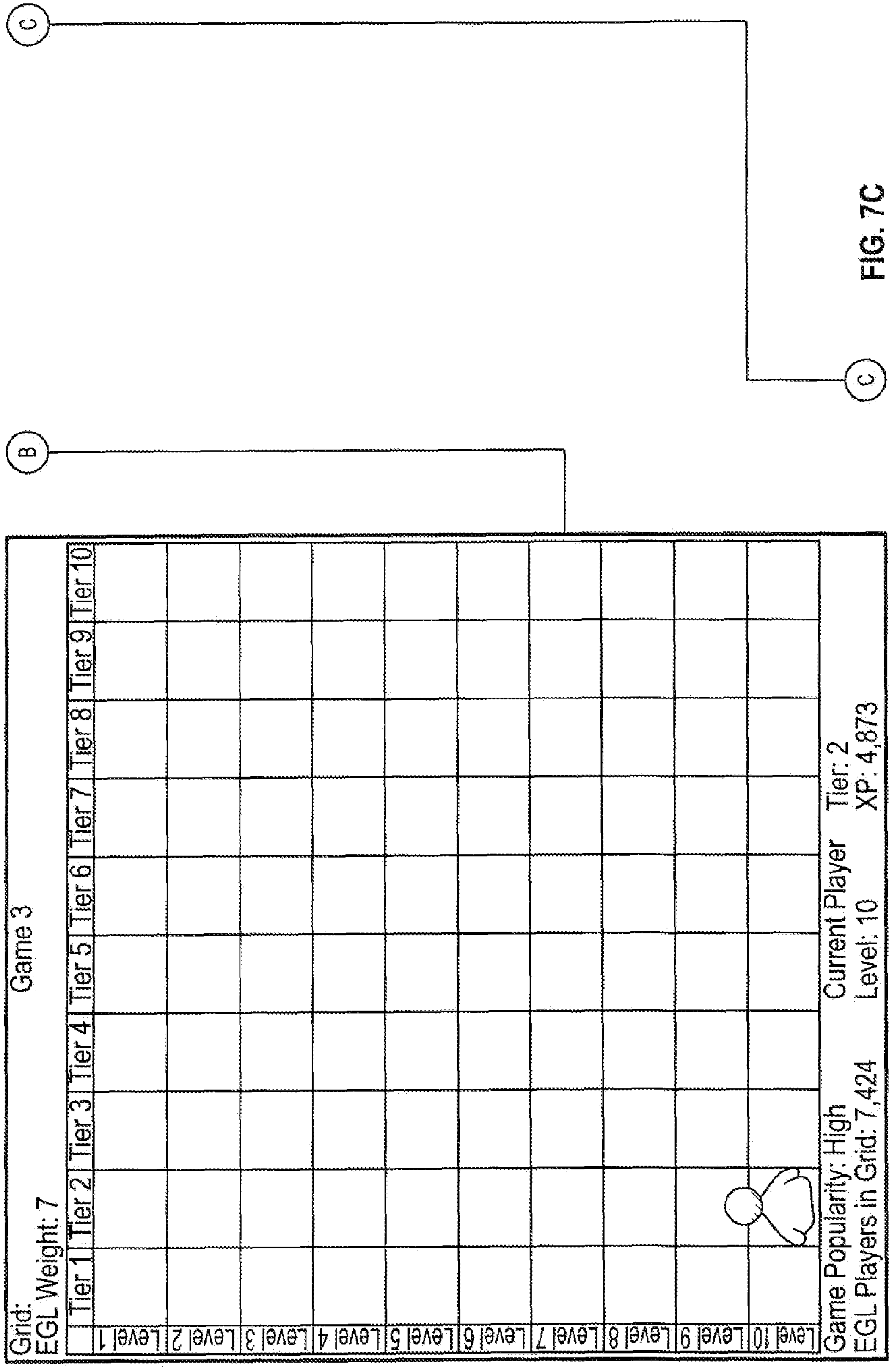
Figure 7D:
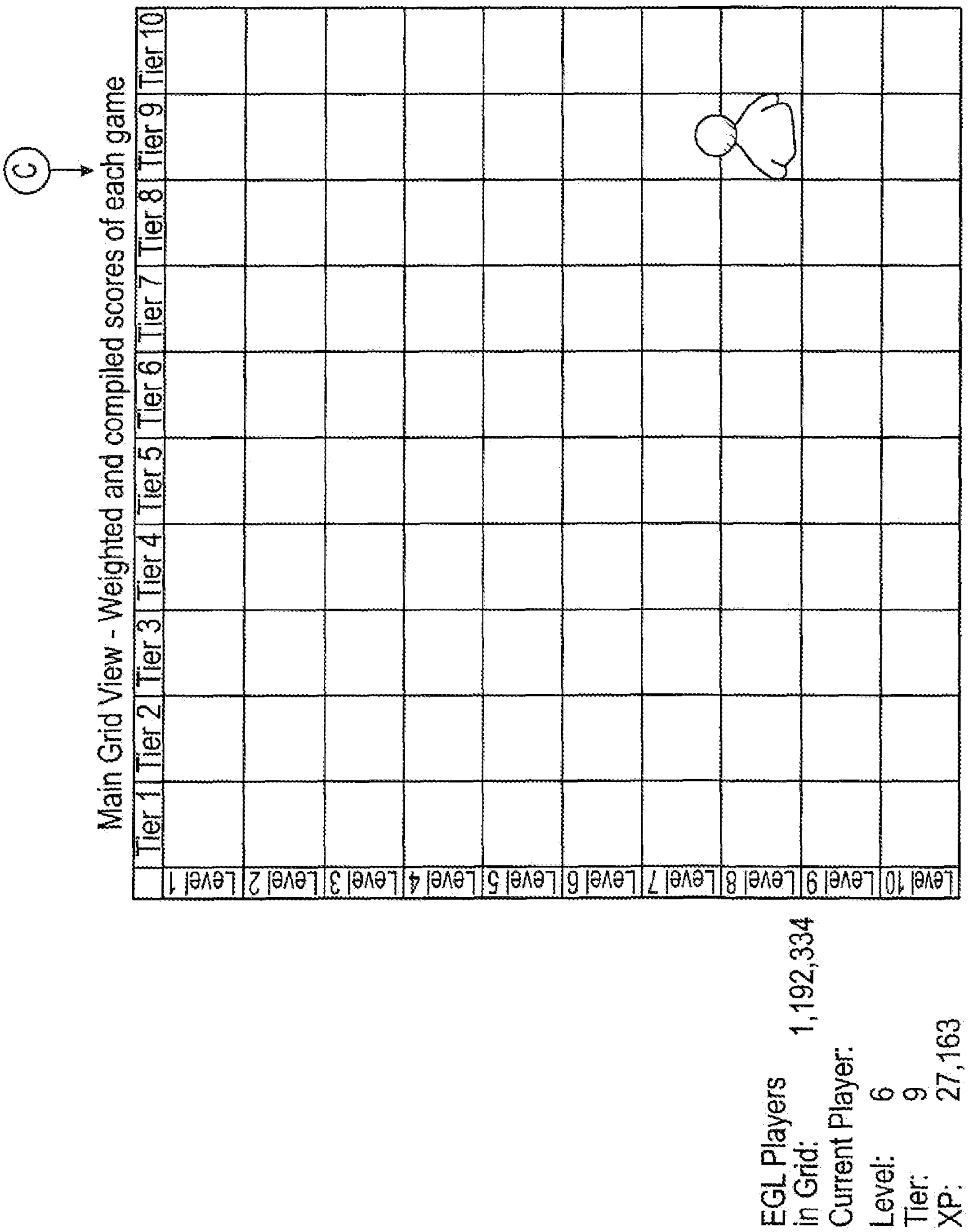

Placement within a particular level and tier may be determined by a player's experience level, which is generally expressed by points accumulated during the play of games as described below. As shown by way of example in FIG. 5, level 1, tier 8 is for players having between 2 million and 4 million experience points. FIG. 7 also contains examples of different game grid placements, showing how they may interact with the player's combined experience points on the main grid. The combined experience points may be determined by a predetermined or dynamic formula. Referring to FIG. 6, individual levels may be thought of as containing high, medium and lower fee portions, with the higher fee portion being the lowest tiers (e.g., tiers 1-3), the medium fee portion being the middle tiers (e.g., tiers 4-7), and the low fee portion being the higher tiers (e.g., tiers 8-10). This characterization is based on player skill level, which should be higher in the lower tiers and lower in the higher tiers. High, medium and low fee portions may also refer to the number of level/tiers the player wants to skip to play a much higher ranked player.

In an embodiment of the present invention, challengers may be charged an entry or activation fee to participate in one or more challenge games, which may be converted into game credits. The amount charged may be uniform or in one embodiment, may vary depending on whether the challenge is in a low, middle, or high fees portion of a level. For example, the fee for a challenge in the low fee portion may be X, the fee for a challenge in the medium portion may be 2×, and the fee for a challenge in the high portion may be 4×—though obviously these values are merely exemplary.

With respect to compensation paid to the defender, this may be in exchange for the defender's services in accepting one or more challenges and participating in the game. As described herein, neither the challenger nor the defender is making a wager, the challenger does not receive monetary compensation and the defender only gets compensated for his services in defending a challenge. This distinguishes the present invention from certain prior art video games for money, which are considered to constitute gambling. In those player vs. player games, both players make a wager and the outcome of the game determines which player receives payment.

It is an object of this invention to allow video game players to earn money by playing video games as a profession without violating anti-gambling laws and to create a professional gamers league by making it possible for professional players to earn large amounts of money because of their skill, without relying on sponsors that may or may not continue sponsoring events.

It should be noted that a game system consistent with an embodiment of the present invention may utilize a plurality of grids. For example, there may be one or more main grids, and one or more sub-grids. Placement within a sub-grid may be based on desired criteria or for desired purposes. For example, a sub-grid can be used for satellite tournaments, practice sessions, game play for specific video games or manufacturers or any other criteria specific to the sorting process. Sub-grids can also have secondary sub-grids to allow the player to narrow or pinpoint the sort criteria even further.

For example, a main grid could generate rankings based on the play of games by ten different game manufacturers, with each manufacturer supplying ten games each. In one embodiment, the players would be permitted to channel from the main grid to any number of sub-grids where rankings may be based only on the player's game of choice. It should be noted that these sub-grids could be hosted on separate servers for ease of hosting specific games.

It should be noted that, rather than permitting the play of multiple game platforms, a grid could be limited to the play of a single game. For example, a grid could be limited to a single player versus player game, such as BATTLEFIELD™ by Electronic Arts™, CALL OF DUTY™ by Activision™, or DELTA FORCE, BLACK HAWK DOWN™ by NovaLogic®. A grid could be limited to a single type of game hardware, such as Microsoft's X-Box™, Sony's Playstation™, Apple's Macintosh®, PC's or other server ranked games or manufacturers. Of course, grid assignment is not limited to the action games or manufacturers mentioned above, and assignment could be based on any game in which players compete against each other such as backgammon, chess, checkers, hearts spades, various poker games etc. whether on-line or land based video or non-video board games and player-participant live games such as baseball, football, soccer, and track.

Still further, it should be noted that a grid or sub-grid could be created based on particular skill sets, for example marksmanship, rather than the play of an entire game. Players on such a grid or sub-grid may play for practice, to improve a particular skill that may be used in the play of an entire game or games. Manufacturers that want to allow players to practice this way, may supply snips or sections of their games for use in practice sessions or incorporate the practice sessions into the game for the players to use at their option. Manufactures may also want to develop their games to conform to the play on the grid, where new skill sets are incorporated based on the position the player attains on the grid. These practice sessions will be explained in more detail below.

An example of skill sets for non-action on-line video or land-based games can be provided with respect to poker. One or more challengers could challenge one or more defenders to play poker. As in embodiments for action games, participating poker players may earn achievement points during the play of the poker game. Point calculation for ranking purposes could be based on a combination of winning or losing a specific hand and how that hand was won or lost. Demonstration of particular player skills, such as bluffing, bad beats, figuring out what the other player has, winning all the chips in the game, all-in moves or any other skill set could be factored into the calculation of player achievement points. Player points may then be used to determine grid location, as otherwise disclosed herein, or grid location may be determined solely based on win/loss points and how those points were won or lost.

Chess is another non-action game, like poker, that could be used with the system of the present invention. As with poker, both wins and losses as well as skill sets can be used to calculate point totals that can then be utilized to determine ranking. Chess skill sets could include the ability to utilize a particular opening or gambit, such as Latvian Gambit, the Two Knights Defense, the Boden-Kieseritzky Gambit, the Max Lange Attack, the Wilkes-Barre or Traxler Variation, the Lolli Variation, the Fred Liver attack, the morphy variation and others. There are many other moves in chess that can used to measure the players experience level.

Figure 15:
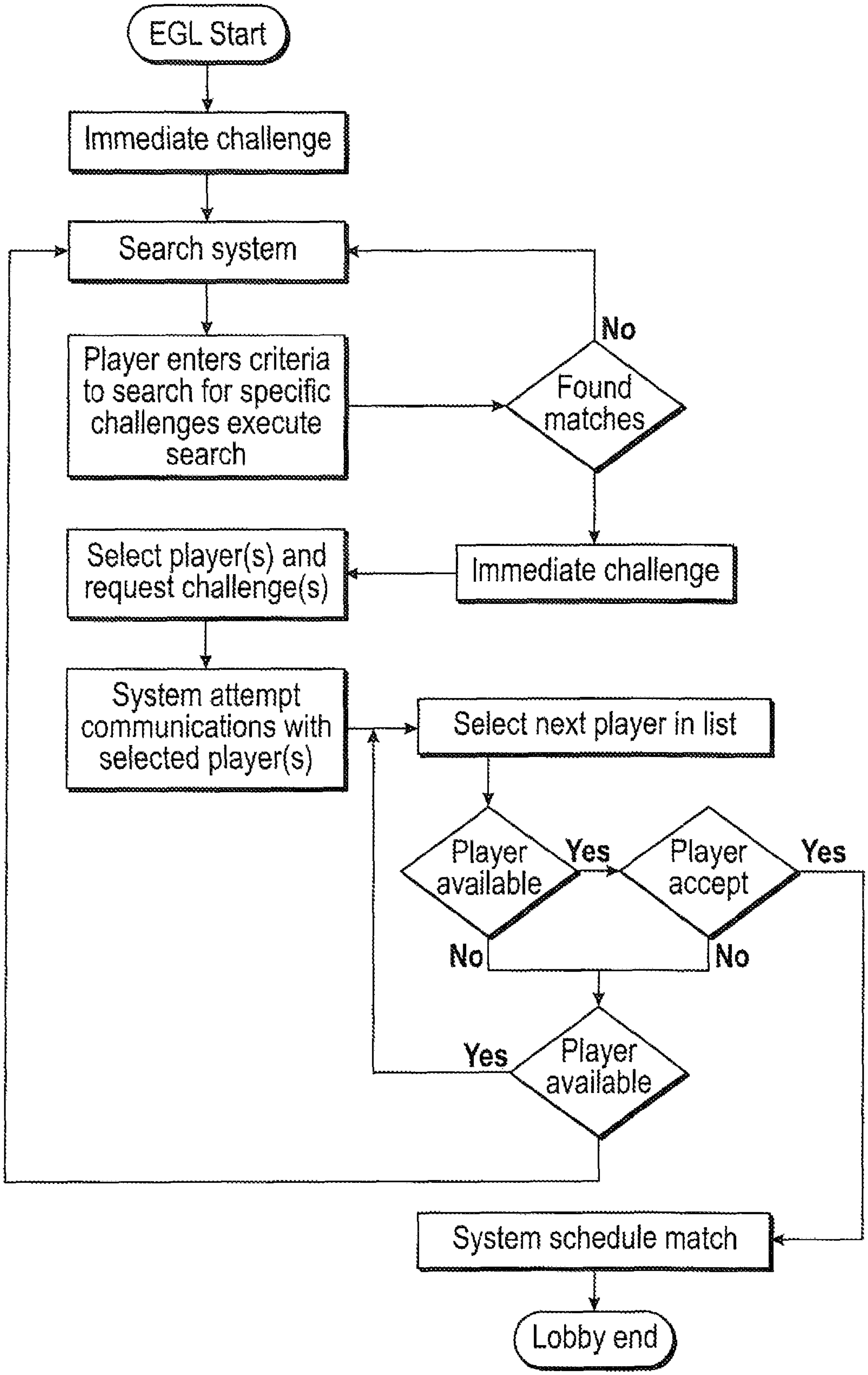
FIG. 15 is a flow chart illustrating steps in a game system in accordance with an embodiment of the present invention.

Referring now to the flow chart of FIG. 15, a general overview of an embodiment of the system and method of the present invention is provided. A player who has completed a registration process begins by logging in to the system. If the player is confirmed as having been validly registered, he is allowed entry to the main gaming interface. From there, a player has three main options. A player can enter the "lobby," which is the portal to challenging or defending against another player, entering a gaming chat room or discussion forum, or reviewing the grid(s). A player may also enter his "account," which is the portal to review challenge responses and system configuration A third option is "banking," where a player may go to review or revise player information, choose a method of payment to put funds into the challengers account to pay game activation fees or other costs a player may be charged, choosing a method of payment to the defender for being compensated for his services and/or to convert gaming credits to money or other things of tangible value.

Figure 4:
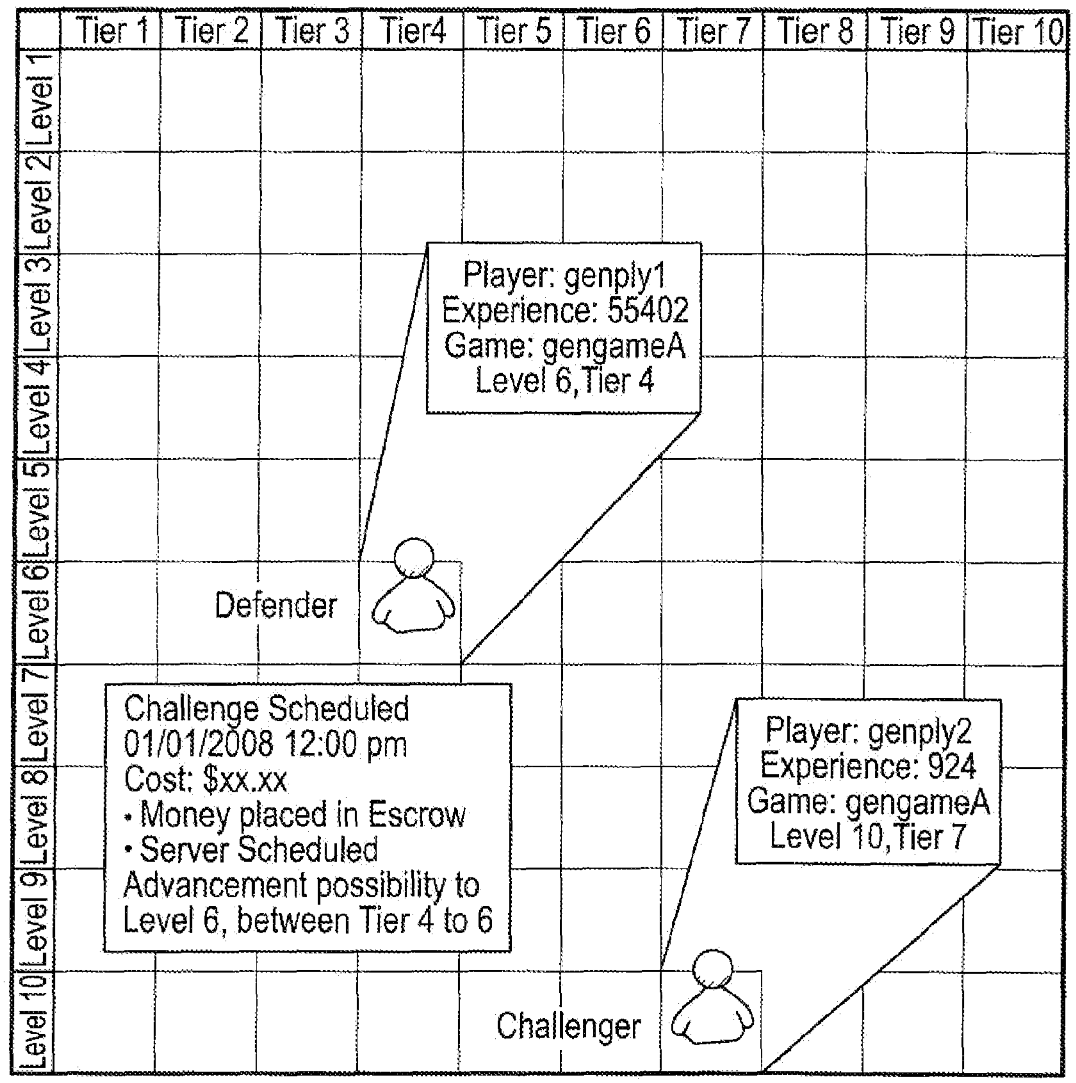
FIG. 4 is an example of a player grid, illustrating a challenge between a first player at level 10, tier 7 and a second player at level 6, tier 4.

Attention is now directed to challenges, which are a vehicle for permitting players to accumulate points and/or to advance within the grid. In one embodiment, as shown by way of example in FIG. 4, challenges may only be permitted to be made against players on the same or higher level. As noted above, in one embodiment, challenging players are charged an entry fee, which may be variable depending on the fee level of the challenge, while defenders may not be charged an entry fee and instead may receive compensation for their services without regard to game outcome.

Figure 1:
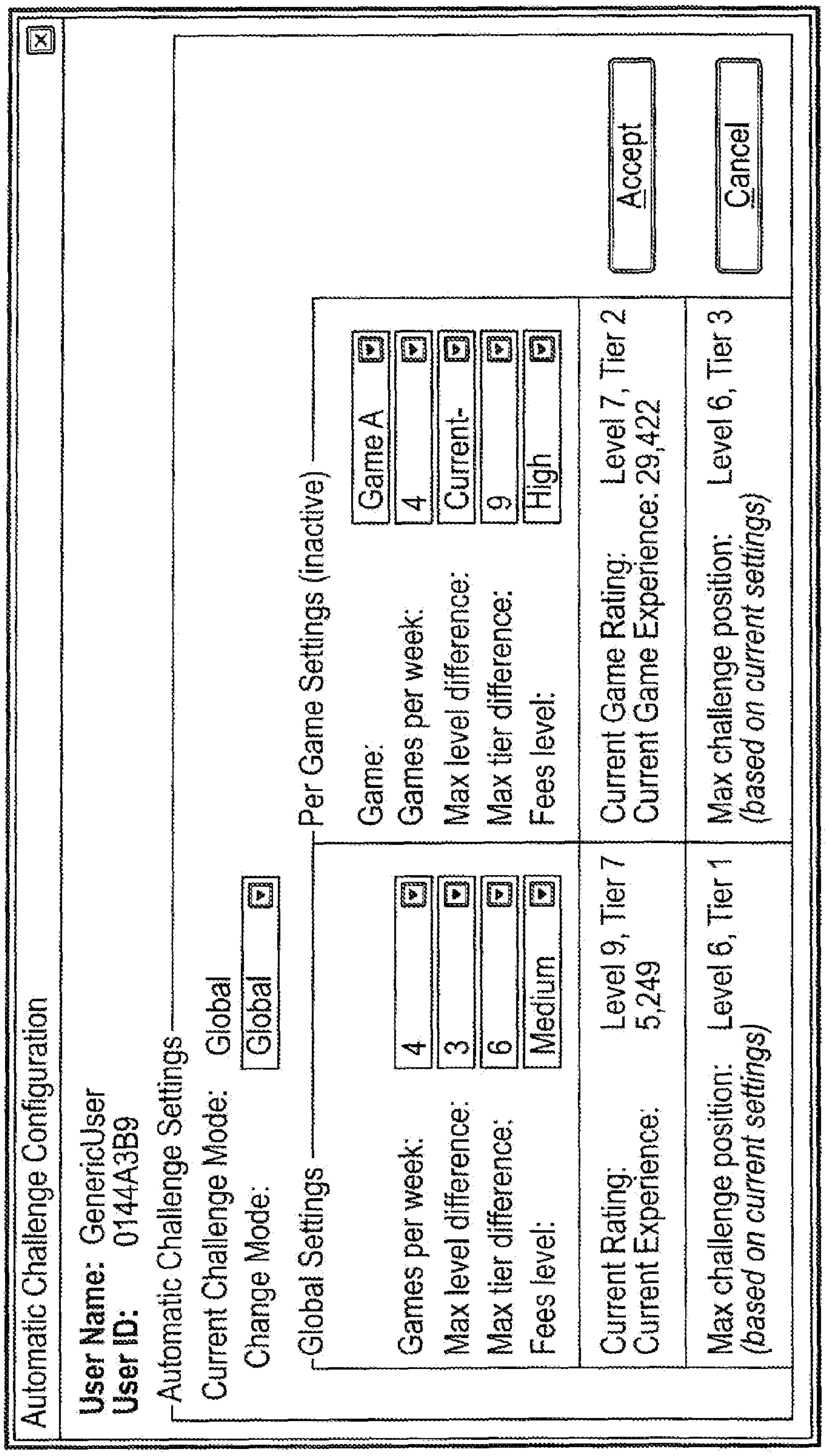
FIG. 1 is an image of a screen display relating to a commitment for a challenge against another player, in accordance with an embodiment of the present invention.

In one embodiment, challenges could be automated according to the individual player's achievement level. Referring to FIG. 1, in one embodiment, a player is presented with a screen, in which he or she may enter data that will be used to determine, in an automated fashion, the identity of one or more potential defenders for the challenger to play by specifying the maximum number of levels and tiers, from the challenger's location, where the defender can be located. The player may also be prompted to enter a number of games per week that the player wishes to play, and the fee level that the player wishes to pay. Using these selections, the system automatically selects possible defenders and facilitates the setting up of games between challenger and defender, as set forth in more detail below.

Figure 2:
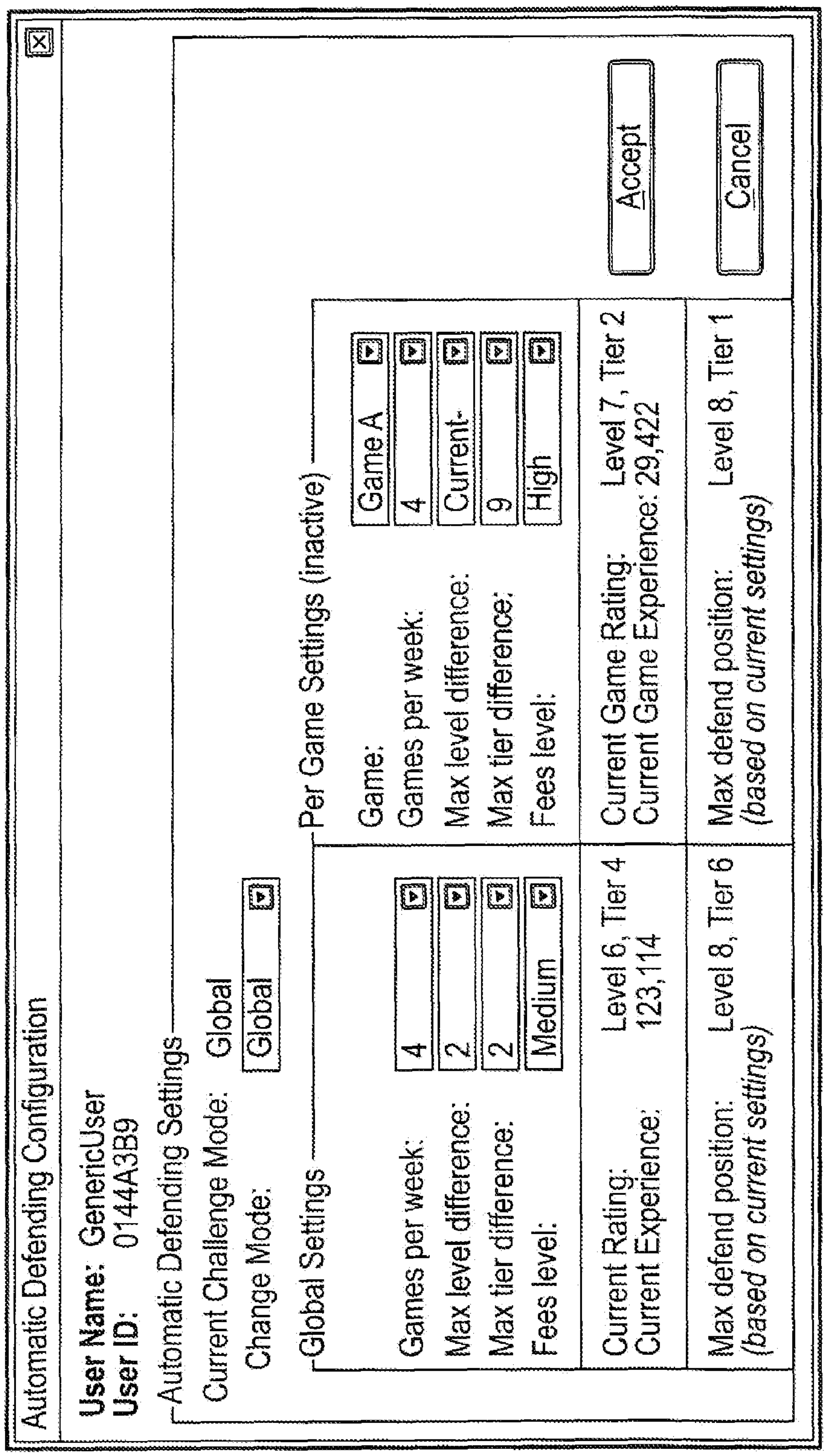
FIG. 2 an image of a screen display relating to a commitment to defend against another player, in accordance with an embodiment of the present invention.

Referring now to FIG. 2, players may also enable automated acceptances of challenges from lower ranked players; i.e., players may automate the process of playing as defenders. Here as well, players may be prompted to specify the maximum number of levels and tiers from which challenges will be accepted, the number of games per week that the player is willing to play as a defender, and fee level. The defenders could be required to play a certain percentage of their games in the automated fashion to insure that they could not just cherry-pick the challengers paying the higher fees.

Figure 9:
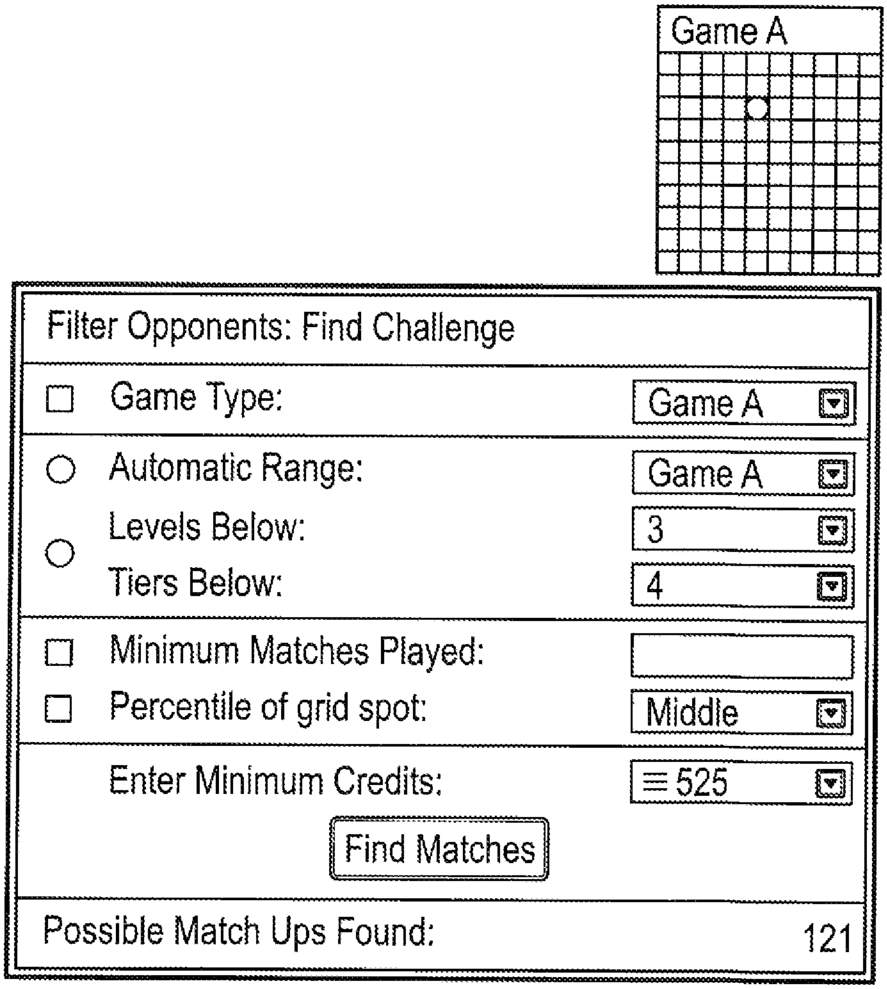
FIG. 9 is an image of a screen that a player may access for purposes of finding a player to challenge, in accordance with an embodiment of the present invention.
Figure 16:
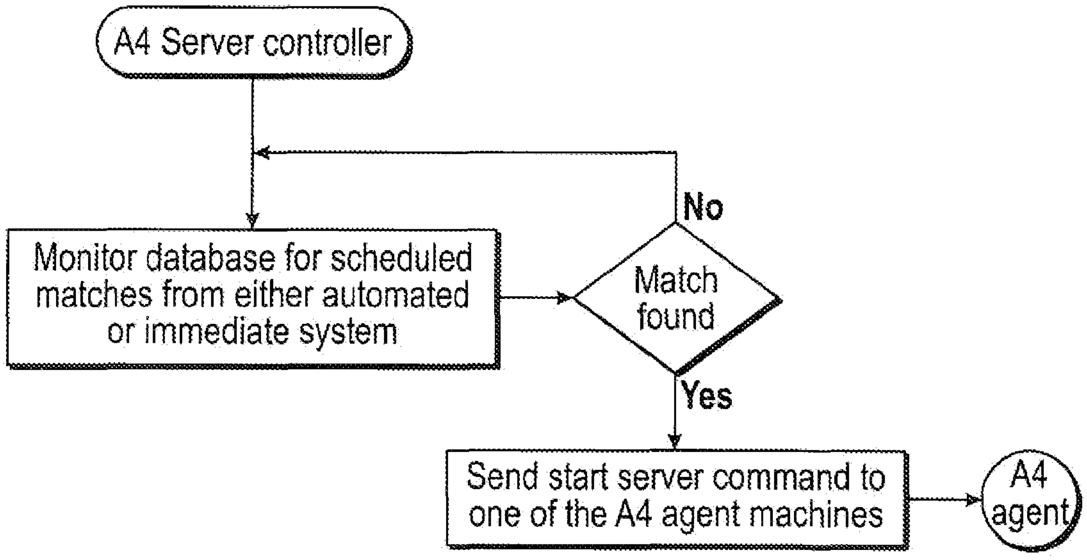
FIG. 16 is a flow chart illustrating steps in an immediate challenge portion of a game system in accordance with an embodiment of the present invention.

It can be seen that automated challenges present challengers with the opportunity to play any defender at any level that is within the prescribed range and gives all players an equal chance to advance on the grid and an equal chance to play a champion. Challenging may also be permitted on a non-automated basis. Referring to FIG. 16, a more detailed explanation of the immediate challenge option, accessible through the "lobby" portal, is provided. A player desiring to issue an immediate challenge may execute a search using the search system. The screen image of FIG. 9 is exemplary of how a search query for issuance of an immediate challenge, or acceptance of an immediate challenge, may be executed. In this example, a player is prompted to define the criteria for challenge invocation or acceptance by selecting the game type for which the challenge will be issued, to either allow the computer to select the range within which a challenge may be found or to customize the level and tier range for issuance of the challenge, to specify the fee range (e.g., low, medium, high), and the minimum number of credits to be paid for the challenge. A grid may be displayed as part of the image, to aid players in defining challenge criteria. The system is then asked to "Find Matches" in response to the search query.

Figure 10:
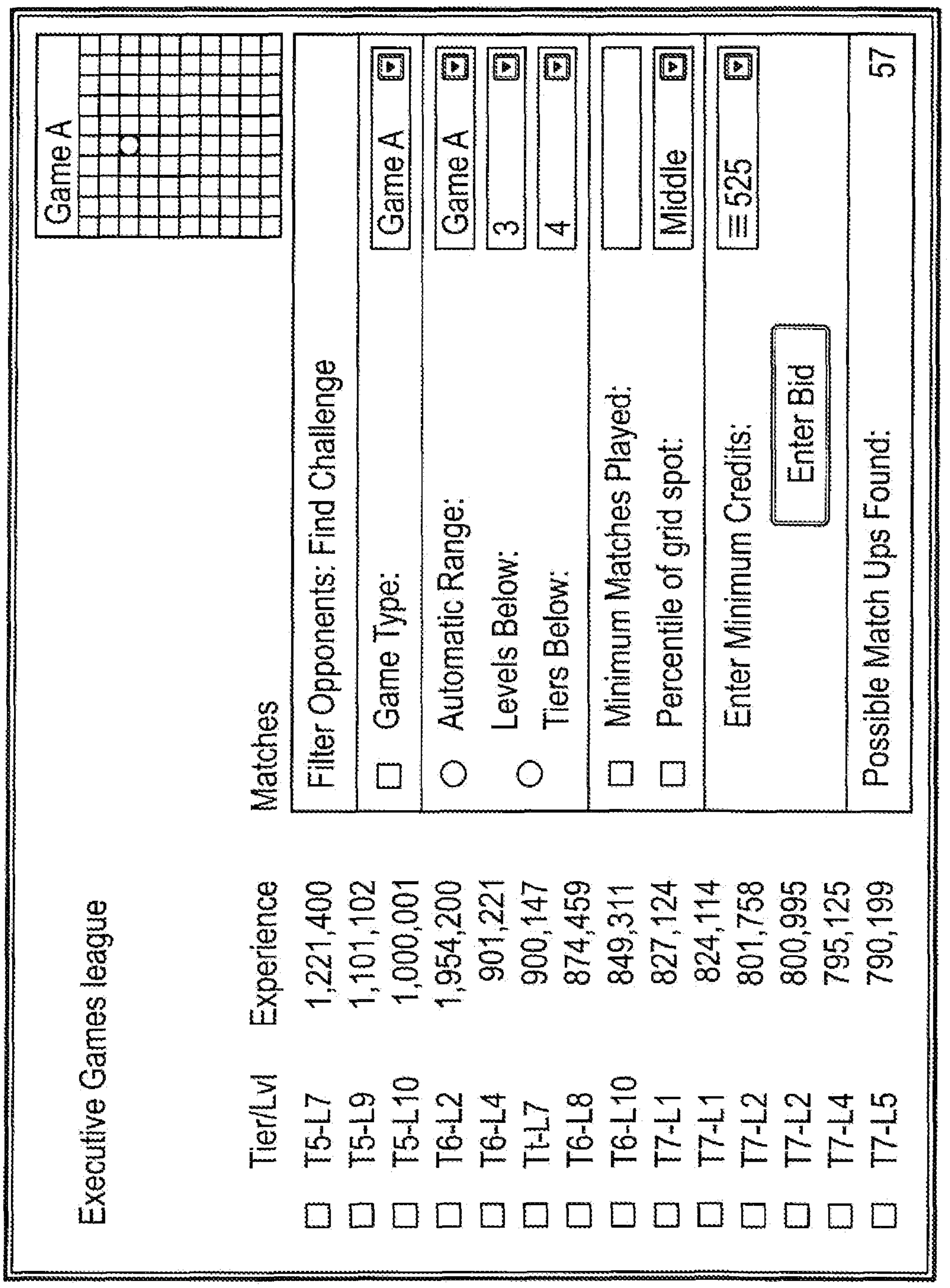
FIG. 10 is an image of a screen that a player may access to search for challenges based on player-defined criteria.
Figure 11:
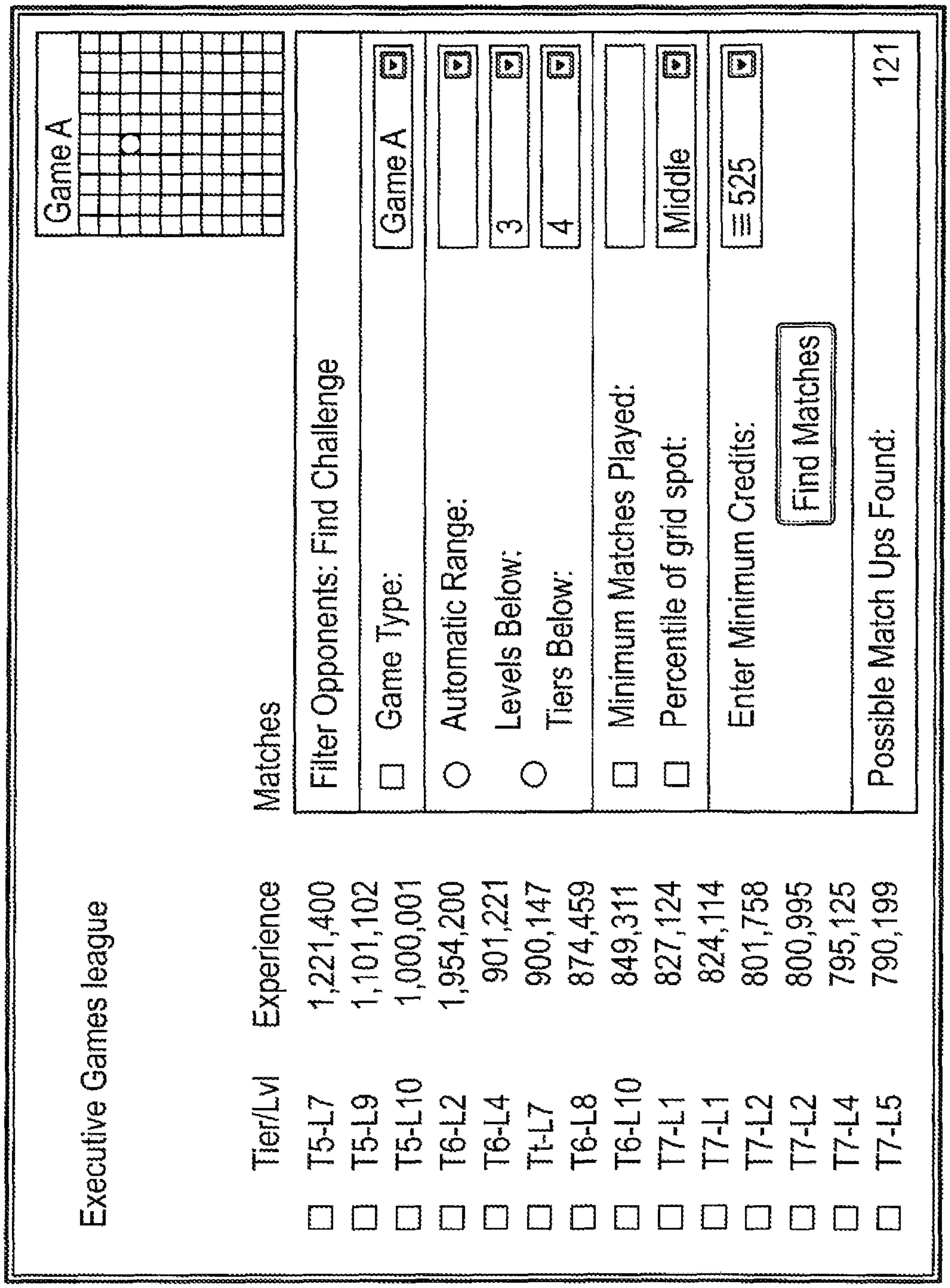
FIG. 11 is an image of a screen that a player may access to find a challenge match based on player-defined criteria.
Figure 12:
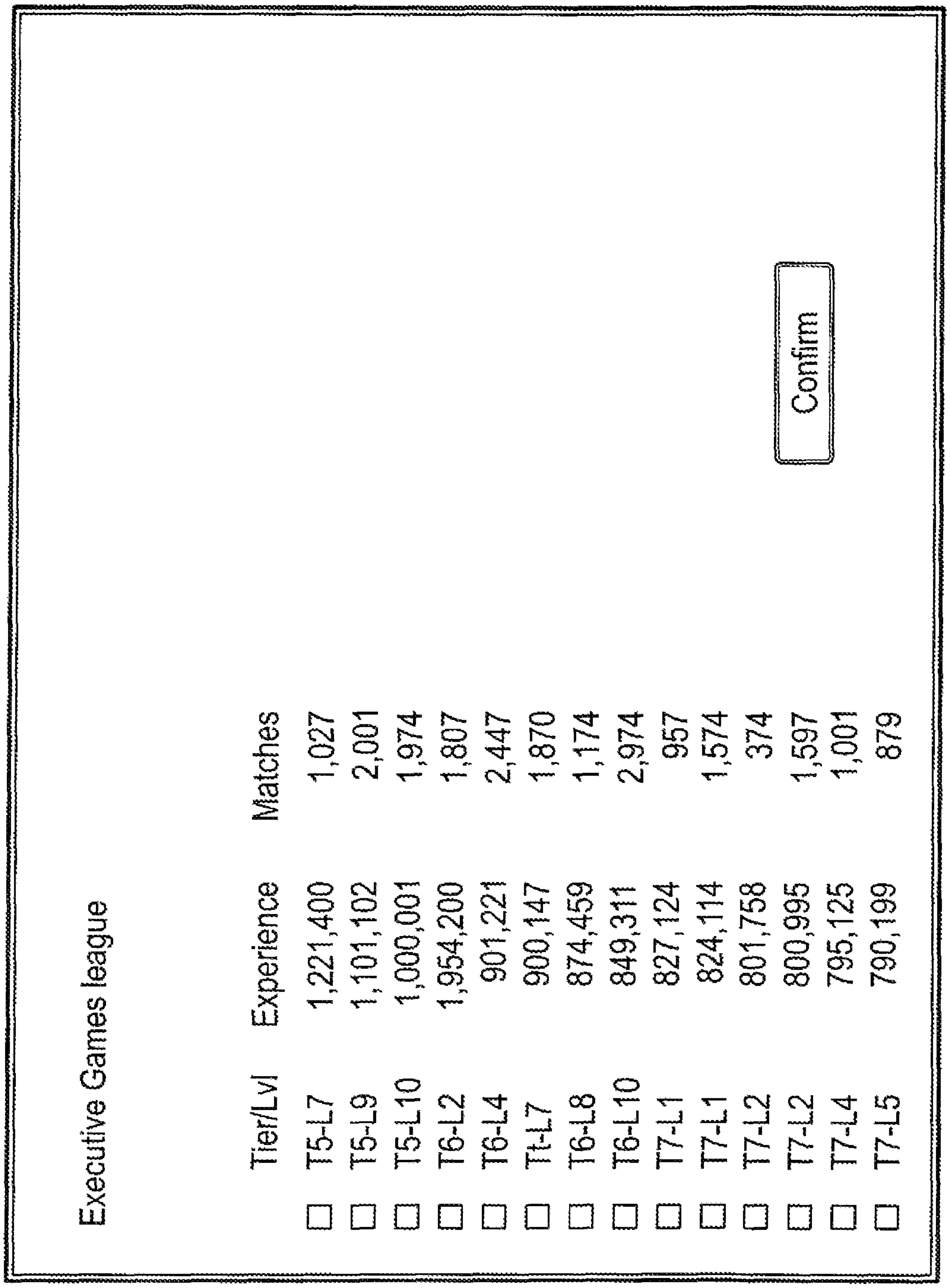
FIG. 12 is an image of a screen that a player may access to confirm a challenge match.

Continuing with the flow chart of FIG. 16, if matches are found, the searcher is provided with a list of players FIG. 10 is an example of an image of a match list, provided by the system, in response to a challenger's search request. The challenging player selects one or more players by checking the box next to their data, and issues challenges to them through the system by selecting "enter bid." If the player is available and accepts, the system schedules the match, and the challenging player exits the lobby. If not, the challenging player may continue the process with another player on the list. FIG. 11 is an example of an image of a match list, provided by the system, in response to a defender's search request. The defending player selects one or more players by checking the box next to their data, and offers to accept challenges from them by selecting "find matches." An accepted challenge may be confirmed, at a screen like that depicted in FIG. 12, by selecting "confirm."

Figure 17:
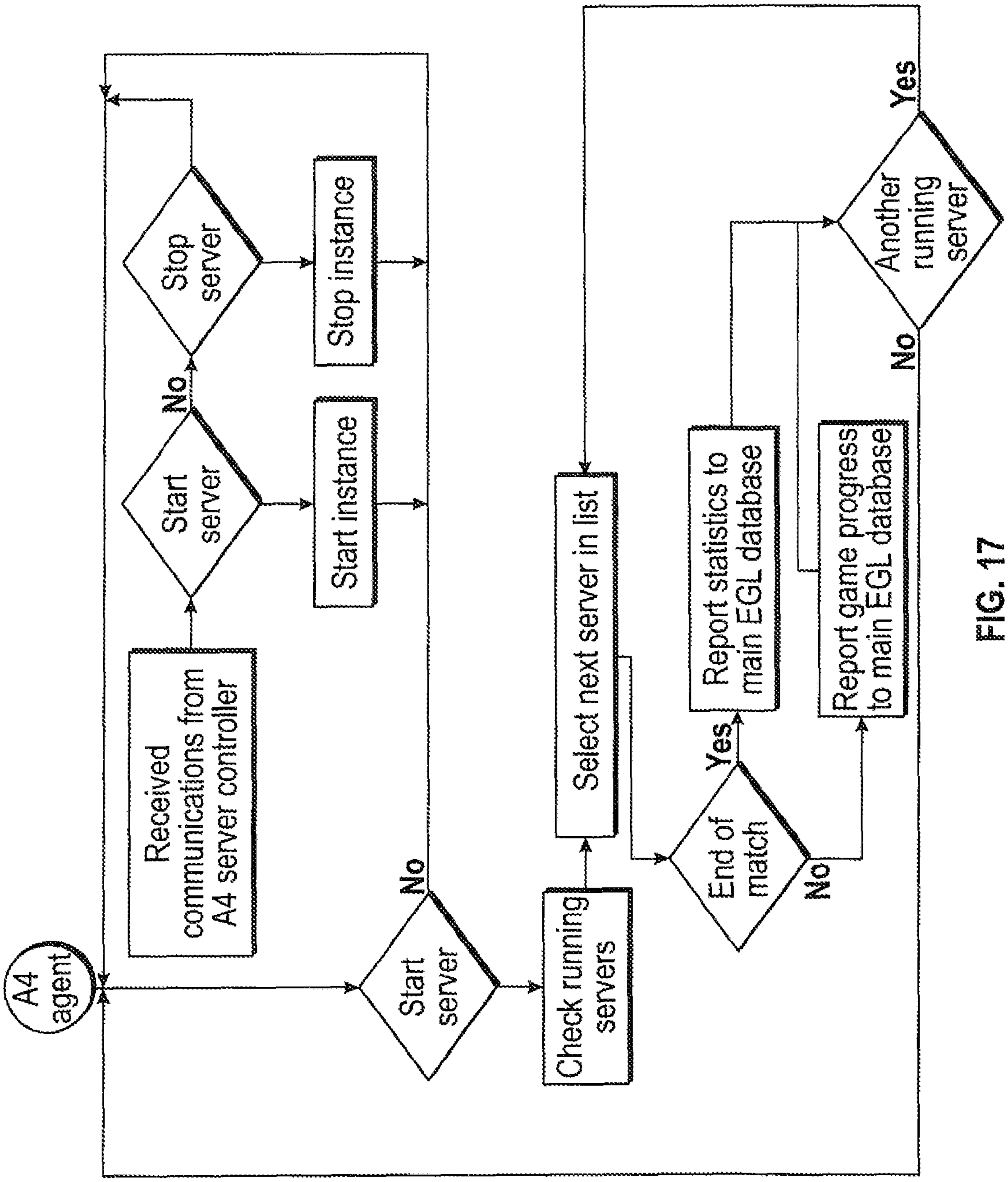
FIG. 17 is a flow chart illustrating steps in game play and statistics reporting portions of a game system in accordance with an embodiment of the present invention.

Referring now to the flow chart of FIG. 17, once a game is scheduled, the server controller sends a start command to an agent machine. The agent machine locates a running server which hosts the game. When the game (or match) is completed, the statistics relating thereto are reported to the system database.

Whether as a result of an automated challenge or an immediate challenge, set up of the actual game may proceed in similar fashion. A game instance controller of the system may send passwords and other needed information (e.g., game time) by email or the like to defender and challenger, allowing them to log in and "meet" for their scheduled match. Control may then be passed to a game statistics tracking system to monitor the game and to track player statistics to enable final point calculations at the end of the game.

Figure 14:
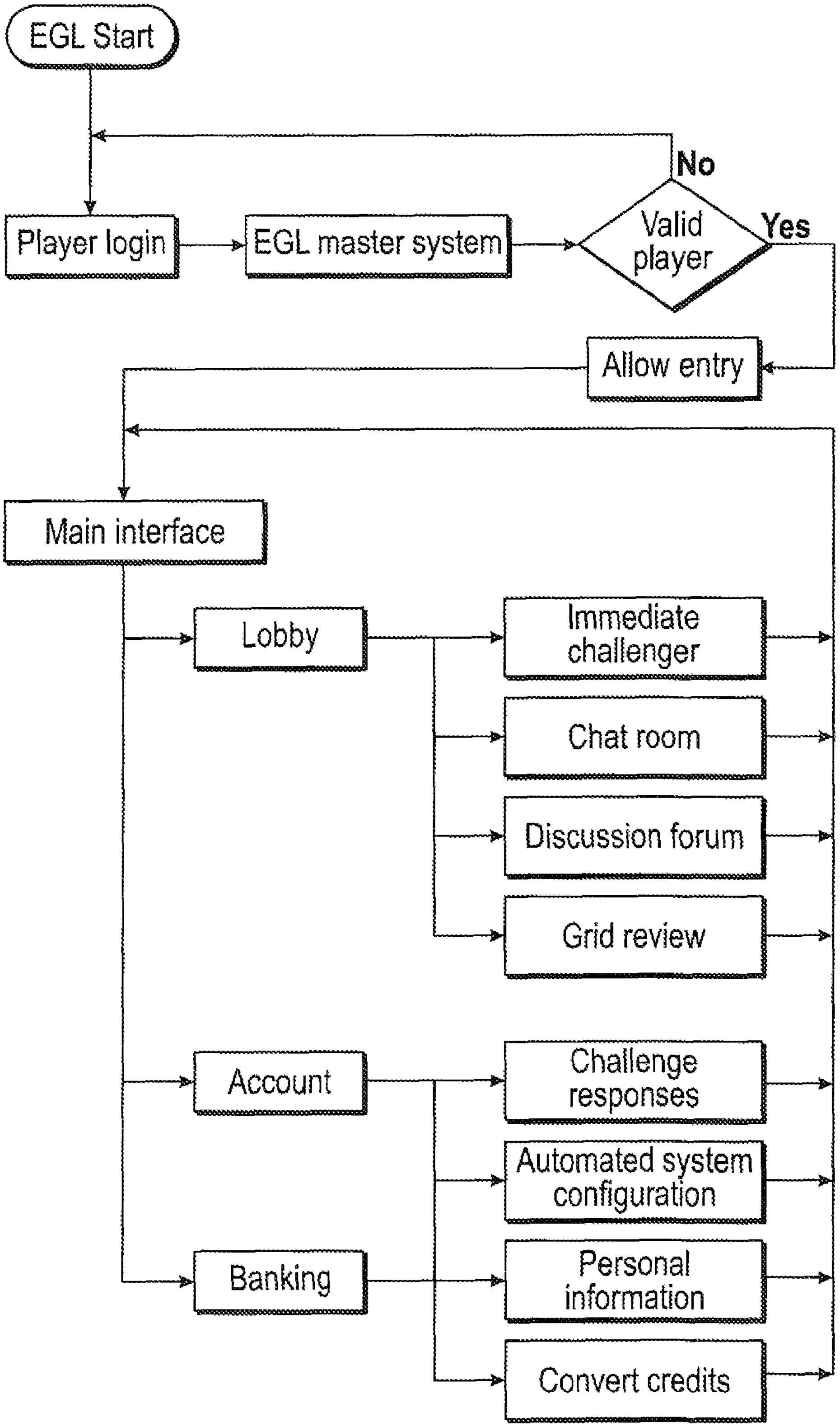
FIG. 14 is an illustration of scoring for a challenge match between two players, in which the higher-ranked player has lost to the lower-ranked player.

Referring now to FIGS. 13-14, an illustration of statistical tracking of a game played as a result of a challenge is displayed. Referring first to FIG. 13, at the upper portion thereof, the table illustrates particular items relating to the play of a game, and points associated therewith. For example, a win is worth 10 points, a loss is worth negative five points, a kill is worth five, a head shot is worth 12, and so on. In addition, it can be seen that points relating to tier placement are also provided. Thus, for each tier level difference between the players, a lower ranked player is awarded an additional 1,000 points per tier if he succeeds in beating the higher-ranked player. The lower ranked player will lose 200 points per tier in the event the challenge is unsuccessful. If the upper player wins, he wins 50 points per tier. The points in this example are of course exemplary.

The lower portion of FIG. 13 illustrates an exemplary statistical outcome of a challenge match between a challenger at level 5, tier 7, and a defender at level 4, tier 7 in which the defender wins. It can be seen that points are awarded—according to the values in the upper portion of FIG. 13, for winning and losing the game, for the 10 tier differential between the players, and for individual skill elements (e.g., knife kills, head shots, etc.) executed during play of the game. In this example, the defender has been awarded 613 experience points, while the challenger has been awarded 147. These experience points may be added to the player's previous total, and their ranking may be re-calculated.

Figure 18:
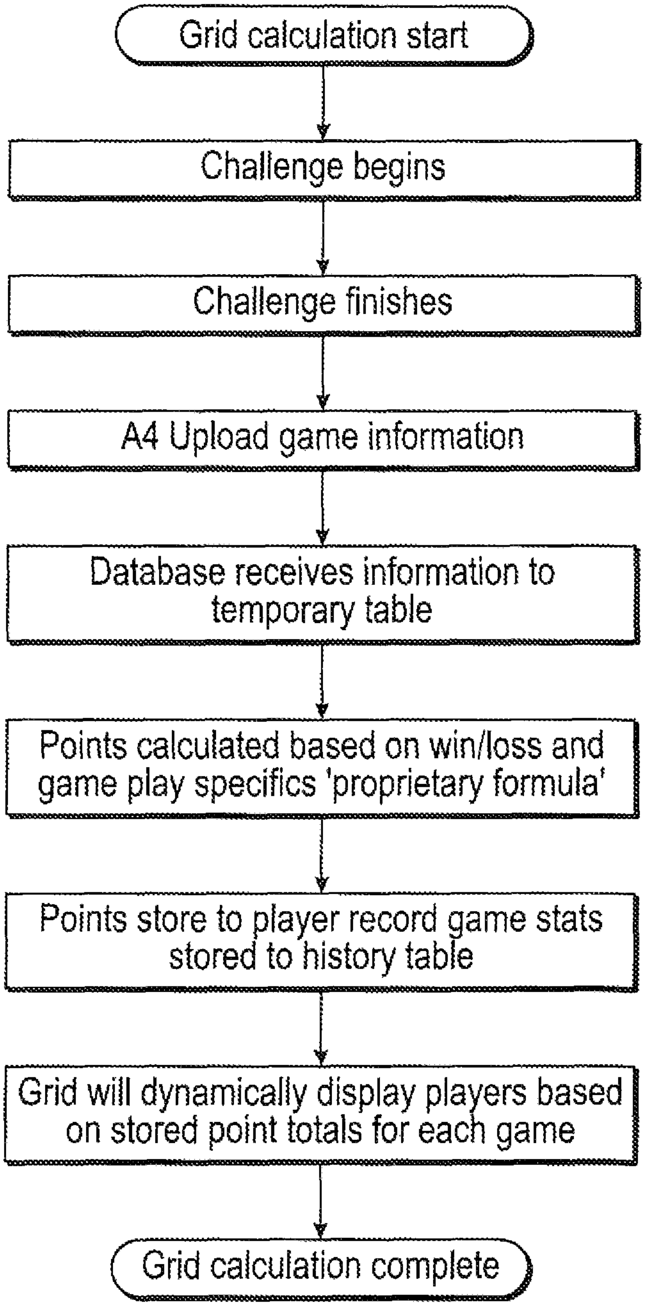
FIG. 18 is a flow chart illustrating grid position recalculation following play of a game, in accordance with an embodiment of the present invention.

FIG. 14 illustrates an exemplary statistical outcome of the same game, with the challenger rather than the defender prevailing. It can be seen that the most pronounced difference in point awards between the FIG. 13 outcome and that of FIG. 14 relates to the tier difference totals. Because there are 10 tiers separating the players, the defenders loss costs him 2,000 points—i.e., 10 times negative 200 points per tier. The challenger's victory results in an award of 10,000 points—i.e., 10 times 1,000 points per tier. It can be seen that a successful challenge can be extremely rewarding, in terms of accumulated pints, to the challenger, while an unsuccessful challenge can still result in the challenger accumulating some points and advancing. Once a match is complete, the game statistics tracking system will report the final information to the main database. Each player's experience points will be calculated and added to their profile in the database. As illustrated in FIG. 18, ranking adjustments may follow completion of a challenge match.

In one embodiment, game credits may be convertible into cash or other things of tangible value. Where this option is provided, the system may provide a secure method in which players can convert their credits. Where such compensation is to be provided to players, the system may need to obtain from the players, whether at registration or at some other stage, sufficient information (e.g., name, address, social security number) to be able to issue a Form 1099 or other required tax form to a player.

Variations on these challenge methods are also possible. For example, players that want to skip levels or challenge a highly ranked or specific player could be allowed to bid for the openings to play these specific players according to a predefined or dynamic formula. Such bids may be used, in part, to fund higher payouts in varying amounts to the defender who defends against such a challenge.

Play may proceed according to player-initiated challenges, according to one or more embodiments as described above. Alternatively, play may be organized in a tournament format. With respect to tournament play, it may be desired to have an annual or semi-annual tournament, and additionally to provide satellite tournaments to decide who will be invited to the larger tournament, whether a player will be permitted to participate in the larger tournament for free, the entry fee that will be charged to a particular player, and/or seeds for the larger tournament. If a satellite tournament lasts three days and there are multiple tournament sites having tournaments at the same time, the player can sort each tournament site for the types of games played, length of the tournament, the rankings of the participants, number of participants or other factors the player needs to choose from. These sort methods will help the player to decide which tournament fits his personal preferences.

With respect to entry fee level, it may be desired to calculate this based on the player's location on the grid, or based on any other criteria the tournament directors decide. For example, Level one the tier one players could be invited to a regional tournament for free and the level one tier two players could pay an entry fee of $20.00 and level one tier three players could pay an entry fee of $30.00 dollars, and so forth. A predetermined number of regional winners could play other regions until there was a nationwide (or other larger region) championship playoff. A predetermined number of players from nationwide could then be placed in worldwide playoffs against playoff participants from other countries. The playoff games could also have sponsors contribute to a tournament playoff pool. There may be challenge matches in the playoff games with players bidding to play well known players, which could further increase funds in the playoff pool. A sponsor may be able to bid on behalf of their player(s) or team(s) to play a player or team represented by another sponsor.

Playoff tournaments could have all the skill sets incorporated into the championship playoffs Players who have not achieved higher tiers on the ladders would be at a distinct disadvantage at tournament time, so it may be desired to incorporate in the grid system a side-rid method of play, which will be described in more detail below, where game outcomes do not affect grid rankings (While the term "side-grid" is utilized herein, it should be recognized, except as expressly claimed otherwise, that the intent is to describe a system and method wherein players may be ranked and may be able to both engage in play that affects rankings and practice play that does not affect rankings Those rankings may be reflected in a grid as described herein, in a ladder, or otherwise.)

Therefore another embodiment of this invention includes "side-grid" practice sessions. Each individual video game grid could have a side-grid, this side-grid would allow practice for a particular video games skill sets. Video games like those mentioned above have different levels of play, and each level can represent a learning experience for the player. Players are often expected to learn new skill sets as they progress in the game from level to level. If a player is new to a certain video game/level, he may be at a distinct disadvantage when playing a seasoned player. This disadvantage could hamper the effectiveness of the game system because inexperienced challengers have little chance of winning against an experienced defender. Side-grid games may be utilized to allow players to develop new skill sets at each tier of the grid or level of the game that can be practiced before entering a match. Side-grid practice sessions may not improve rankings and may not allow for Defenders to receive monetary compensation.

For examples side-grid practice sessions could be made available at entry level to allow new players to sharpen their skills before making a challenge to achieve a position on the grid. Side-grid practice sessions could also be permitted to allow players to improve their play and learn new skill sets to prepare them to challenge defenders at higher tiers. To accomplish this, the grid system would allow for the practice of different skill sets used at different specific levels of a game or specific levels or tiers of grid play. Side-grid practice sessions would be available to both challengers and defenders; players would have the option of sorting to find suitable players to practice with. Players may be given the option to practice only the new skill sets at a specific level of the game or specific levels or tiers of the grid or the skill sets at a specific level of the game or specific levels or tiers of the grid coupled with skill sets from any or all of the lower levels of the game and all the lower levels and tiers of the grid. A minimum fee could be charged for side-grid practice sessions or, optionally, side-grid play may not require payment of a fee.

While the invention has been particularly shown and described with reference to preferred embodiments thereof, it will be understood by those skilled in the art that the foregoing and other changes in form and details may be made therein without departing from the spirit and scope of the invention.

I claim:

1. A networked, electronic game method comprising:

accepting participation in play of an electronic game over a network through game systems played by a plurality of players;

determining a rank for individual players of the plurality of players;

positioning the ranked individual players on a grid operated on a game server;

wherein the grid has a plurality of vertical levels and wherein individual vertical levels have a plurality of horizontal tiers, wherein the rank for each of the individual players is based on a location of each player on the individual vertical levels and the plurality of horizontal tiers;

enabling issuance of a challenge by a challenger who is a lower-ranked player against a defender who is a higher-ranked player;

enabling acceptance of the challenge by the defender;

enabling play of the electronic game over the network by the challenger against the defender;

one of awarding or deducting points to the challenger and the defender based on an outcome of the play of the electronic game over the network, where the awarding or deducting of points is based on a predetermined number multiplied by a tier differential between the challenger and the defender, wherein individual skill element points are awarded to one of the defender or the challenger who executes an individual skill during play of the electronic game between the challenger and the defender;

adjusting a rank of at least one of the challenger and the defender as a consequence of the awarding and deducting points based on the play of the electronic game over the network; and facilitating vertical, horizontal, and diagonal movement of at least one of the challenger and the defender along the grid in response to the adjustment in rank.

2. The method of claim 1 wherein movement within horizontal tiers located on the grid is separated into different fee portions.

3. The method of claim 2 wherein the challenger is required to pay an entry fee to play the game against the defender and wherein an amount of the entry fee is varied based on the fee portion in which the defender is located.

4. The method of claim 1 further comprising:

prompting a challenger to define criteria for a plurality of challenge games to occur within a defined period of time, wherein the criteria defined is a maximum tier differential and a maximum level differential between the challenger and the defender;

in response to the criteria, locating defenders to participate in the challenge games against the challenger.

5. The method of claim 4 further comprising:

prompting a defender to define criteria for a plurality of defense games to occur within a defined period of time;

in response to the criteria, locating challengers to participate in the defense games against the defender.

6. The method of claim 1 further comprising:

prompting a challenger to define criteria for issuance of an immediate challenge against a single defender;

in response to the criteria, locating a single defender to participate in the challenge game against the challenger.

7. The method of claim 1 further comprising providing compensation to at least one defender for participating in a game against a challenger, without regard to an outcome of the game.

8. The method of claim 1 further comprising facilitating play by at least one of the challenger and the defender on a plurality of sub-grids wherein vertical, horizontal, and diagonal movement of one of the challenger and defender along the grid is based on rankings provided by play of a game associated with each sub-grid.

9. The method of claim 8 further comprising facilitating play by at least one of the challenger and the defender by one of the challenger and defender channeling from the plurality of sub-grids through the grid.

10. The method of claim 1 wherein enabling issuance of the challenge comprises determining whether the challenger and defender are within a prescribed range.

11. The method of claim 1 comprising searching for the defender.

12. The method of claim 1 wherein the skill-level points awarded is not connected to game outcome.

13. The method of claim 12 comprising associating skills to each vertical level of the grid, wherein the skills must be exhibited before a player reaches the vertical level associated with the skills.

14. The method of claim 13 comprising practicing the skills associated with the vertical level in a sub-grid.

15. The method of claim 12 wherein the criteria incorporates relative position of the challenger and the defender on the grid.

16. The method of claim 1, wherein vertical movement is facilitated by showing at least one new skill at each vertical level.

17. The method of claim 1 further comprising facilitating play by at least one of the challenger and the defender on a side grid wherein the play on the side grid does not affect the rank of the at least one of the challenger and the defender on the grid.

18. A networked, electronic game method comprising:

accepting participation in play of an electronic game over a network through game systems played by a plurality of players;

determining a rank for individual players of the plurality of players;

positioning the ranked individual players on a grid operated on a game server;

wherein the grid has a plurality of vertical levels and wherein individual vertical levels have a plurality of horizontal tiers, wherein the rank for each of the individual players is based on a location of each player on the individual vertical levels and the plurality of horizontal tiers;

enabling issuance of a challenge by a challenger who is a lower-ranked player against a defender who is a higher-ranked player;

enabling acceptance of the challenge by the defender;

enabling play of the electronic game over the network by the challenger directly against the defender only;

providing compensation to the defender for participating in the game against the challenger, without regard to an outcome of the game;

one of awarding or deducting points to the challenger and the defender based on an outcome of the play of the electronic game over the network, where the awarding or deducting of points is based on a predetermined number multiplied by a tier differential between the challenger and the defender, wherein individual skill element points are awarded to one of the defender or the challenger who executes an individual skill during play of the electronic game between the challenger and the defender;

wherein the awarding and deducting points for individual skill elements performed during play of the game is not connected to game outcome;

adjusting a rank of at least one of the challenger and the defender as a consequence of the one of awarding and deducting points based on the play of the electronic game over the network; and facilitating vertical, horizontal, and diagonal movement of at least one of the challenger and the defender along the grid, in response to the adjustment in rank.

19. The method of claim 18 wherein the horizontal tiers located on the grid are separated into different fee portions.

20. The method of claim 19 wherein the challenger is required to pay an entry fee to play the game against the defender and wherein an amount of the entry fee is varied based on the fee portion in which the defender is located.

21. The method of claim 18 further comprising:

prompting a challenger to define criteria for a plurality of challenge games to occur within a defined period of time, wherein the criteria is at least one of a tier differential between the challenger and the defender and a level differential between the challenger and the defender;

in response to the criteria, locating defenders to participate in the challenge games against the challenger.

22. The method of claim 21 further comprising:
prompting a defender to define criteria for a plurality of defense games to occur within a defined period of time;
in response to the criteria, locating challengers to participate in the defense games against the defender.

23. The method of claim 18 further comprising:
prompting a challenger to define criteria for issuance of an immediate challenge against a single defender;
in response to the criteria, locating a single defender to participate in the challenge game against the challenger.

24. The method of claim 18 wherein the criteria incorporates relative position of the challenger and the defender on the grid.

25. The method of claim 18 further comprising facilitating play by at least one of the challenger and the defender on a side grid wherein the play on the side grid does not affect the rank of the at least one of the challenger and the defender on the grid.

26. A game system comprising
a grid having a plurality of vertical levels and wherein individual vertical levels have a plurality of horizontal tiers;
an electronic game;
a communications network;
wherein a plurality of players, including at least one challenger and at least one defender are capable of playing the game over the communications network:
wherein the at least one defender is ranked based on a location of the at least one defender on the individual vertical levels and the plurality of horizontal tiers based on points accumulated during play of the game over the communications network;
a challenge invocation module, utilizable by the challenger, to issue a challenge to at least one defender to play the game over the communications network; and
a point determination module for awarding and deducting points for at least one of the challenger and the defender based on the play of the electronic game over the network, wherein the one of awarding and deducting points is based on a combination of a predefined point value multiplied by a tier differential between the challenger and the defender, wherein individual skill element points are awarded to one of the defender or the challenger who executes an individual skill during a of the electronic game between the challen er and the defender.

27. The system of claim 26 wherein the horizontal tiers located on the grid are separated into different fee portions.

28. The system of claim 26 further comprising a challenge acceptance module, utilizable by the defender, to accept the challenge from the challenger.

29. The system of claim 26 wherein the individual skill element awarded is not connected to game outcome.

30. A networked, electronic game method comprising:
accepting participation in play of an electronic game over a network through game systems played over a network by a plurality of players;
ranking the plurality of players on a grid operated on a game server, wherein the grid has a plurality of vertical levels and wherein individual vertical levels have a plurality of horizontal tiers, wherein the rank for each of the individual players is based on a location of each player on the individual vertical levels and the plurality of horizontal tiers;
enabling issuance of a challenge by a challenger who is a lower-ranked player against a defender who is a higher-ranked player;
enabling acceptance of the challenge by the defender;
enabling play of the electronic game over the network by the challenger directly against the defender only;
one of awarding or deducting points to the challenger and the defender based on an outcome of the play of the electronic game over the network, where the awarding or deducting of points is based on a predetermined number multiplied by a tier differential between the challenger and the defender, wherein individual skill element points are awarded to one of the defender or the challenger who executes an individual skill during play of the electronic game between the challenger and the defender;
adjusting a rank of at least one of the challenger and the defender as a consequence of the one of awarding and deducting points based on the play of the electronic game over the network; and
facilitating practice by at least one of the challenger and the defender of skill sets used at different game levels;
facilitating vertical movement by showing at least one new skill at each vertical level of the grid; and
wherein the practice does not affect the rank of the at least one of the challenger and the defender.

* * * * *